United States Patent [19]
Fujita et al.

[11] Patent Number: 5,723,079
[45] Date of Patent: Mar. 3, 1998

[54] METHOD FOR CONTROLLING THE INJECTION SPEED OF INJECTION MOLDING MACHINES AND AN APPARATUS THEREFOR

[75] Inventors: Shigeru Fujita; Susumu Harada, both of Shizuoka, Japan

[73] Assignee: Toshiba Machine Co., Ltd., Tokyo, Japan

[21] Appl. No.: 633,884

[22] Filed: Apr. 17, 1996

[30] Foreign Application Priority Data

Apr. 25, 1995 [JP] Japan .................. 7-100905

[51] Int. Cl.$^6$ ............................................. B29C 45/77
[52] U.S. Cl. .................. 264/40.7; 425/145; 425/149; 425/150
[58] Field of Search .............................. 425/145, 149, 425/150, 169; 264/40.7

[56] References Cited

U.S. PATENT DOCUMENTS

| | | |
|---|---|---|
| 4,135,873 | 1/1979 | Sone et al. |
| 4,734,025 | 3/1988 | Kawamura et al. ............ 425/145 |
| 5,008,052 | 4/1991 | Harada . |
| 5,445,773 | 8/1995 | Arai ................................ 425/169 |

*Primary Examiner*—Tim Heitbrink
*Attorney, Agent, or Firm*—Fish & Richardson P.C.

[57] ABSTRACT

A method for controlling the injection speed of injection molding machines and an apparatus therefor in which a driving force for forwardly moving an injection plunger movably inserted in an injection cylinder is detected by a first detector; when the value PA detected by the detector exceeds a standard value PSH, the forwardly moving speed of the plunger is controlled to be reduced in accordance with a moving speed reduction control profile VD which is determined by a predetermined decreasing function; further, the forwardly moving speed of the plunger at the dwelling phase switching position is detected by the second detector; the judgment that the value VS detected by the second detector exceeds the upper limit VAH and/or the judgment that the value VS exceeds the lower limit VAL is/are conducted; an alarm signal is outputted when the value VS exceeds the upper limit and/or the value VS exceeds the lower limit.

14 Claims, 10 Drawing Sheets

METHOD FOR CONTROLLING THE INJECTION SPEED OF INJECTION MOLDING MACHINES AND AN APPARATUS THEREFOR

BACKGROUND OF THE INVENTION

1) Field of the Invention

The present invention relates to a method for controlling the injection speed of injection molding machines and an apparatus therefore. More particularly, the invention relates to a method and an apparatus for controlling the injection speed of injection molding machines when the moving speed of an injection plunger is reduced during the period that an injection phase is changed from a filling up phase to a dwelling phase.

2) Related Art

In injection molding machines, control of the moving speed of the injecting plunger (screw) in a forward direction is usually conducted in accordance with a program profile, which is preliminarily set up in a computer.

FIG. 1 is a graph showing a conventional program profile in control of the moving speed of the injection plunger. As shown in FIG. 10, in the conventional profile the moving speed of the plunger is controlled in such a manner that the filling stroke of the injection plunger is divided into a plurality of periods, the moving speed of the plunger in a forward direction is designated at every period to set up a multi-rectangular shaped program profile, and is controlled so that the plunger moves in a forward direction according to the speeds V1, V2, V3 and V4 set up in the program profile in accordance with the position of the plunger.

The moving speeds V3 and V4 in the profile, are set up so that the moving speed of the injection plunger may be reduced before a point of time where melted resin is completely filled up in the course of a mold cavity and in order to prevent that the pressure of the resin becomes abnormally high in the mold cavity.

According to such a setting of the moving speed of the injection plunger, a driving force PA for moving the plunger in a forward direction varies as shown in FIG. 1.

It is required that the speeds V3 and V4 of the program profile are set up so as to reduce the moving speed of the plunger and to properly reduce the moving speed and to prevent that the moving speed of the plunger is reduced too much and the resin is cooled down too much in the vicinity of the end portion of the cavity during the period that the resin is filled up. It is further required that the reduction of the speed is set up without exceeding any deficiencies and in accordance with the shape of the article to be molded and according to the property of matter of the resin material to be used.

Previously, the characteristic of the reduction of the moving speed of the plunger was mostly set up on the basis of trial and error in the experience of the operator.

However, a highly experienced know how is necessary to set up the moving speed reduction characteristic according to which the speed reduction is effected in a proper manner and it is prevented that the resin is cooled down too much in the vicinity of the end portion of the cavity; it makes it therefore difficult to set up the molding condition. The molding condition is actually set up in such a manner that trial moldings are repeated many times to find out a compromise control characteristic of the moving speed reduction characteristic of the plunger. Therefore, there is a drawback in that it takes much time to set up a suitable characteristic in the reduction of the moving speed of the plunger.

Further, when the moving speed of the injection plunger is reduced in a multi-step manner from V3 to V4, the pressure of the melt resin in the mold die varies with a waved-like shape, as apparent from the variation of the driving force PA for moving the plunger in a forward direction. That is to say, the pressure of the melt resin in the mold die cannot be kept in a good manner. In order to solve the drawback, it is necessary to change the moving speed of the plunger in a multi-step manner during the moving speed reducing period, or to set up a moving speed reduction characteristic in accordance with a suitable moving speed reducing function. However, these make the setting of the program profile much more difficult.

SUMMARY OF THE INVENTION

The present invention has for its purpose to provide a method and apparatus for controlling the injection speed of injection molding machines, in which it is automatically judged if the moving speed reduction characteristic of an injection plunger is set up in a suitable manner, the thus set up moving speed reduction characteristic is automatically corrected in accordance with a result of judgment, and a suitable moving speed reduction characteristic without exceeding any deficiency is automatically set up by the learning control.

In order to carry out the above-mentioned purpose, a method for controlling the injection speed of injection molding machines according to the present invention comprises the following steps:

- detecting a driving force for forwardly moving an injection plunger, which is movably inserted into an injection cylinder by a first detecting means;
- controlling of a forwardly moving speed of the injection plunger to be reduced in accordance with a moving speed reduction profile directed from a predetermined greater speed reduction function at a position of time that the value detected by said first detecting means exceeds a predetermined standard value;
- detecting the moving speed of the injection plunger in a forward direction by a second detecting means during the period that the moving speed of the plunger is reduced;
- judging at least one of the two cases if the value detected by said second detecting means exceeds a predetermined upper limit, and if said value detected by said second detecting means is lower than a predetermined lower limit; and
- outputting an alarm signal when the value detected by said second detecting means exceeds said predetermined upper limit or exceeds said predetermined lower limit.

The method according to the present invention has a second aspect in that said judgment is conducted at a position where the injection phase is changed from a filling phase to a dwelling phase.

The method according to the present invention has a third aspect in that the upper limit and/or the lower limit is/are set up as a continued line or a plurality of points with a predetermined pitch during the moving speed reducing period in accordance with the moving speed reduction characteristic, so that said judgment is conducted continuously or at a plurality of points during the moving speed reduction period.

The method according to the present invention has a fourth aspect in that:

when the value detected by the second detecting means becomes lower than said lower limit during the moving speed reduction period, the moving speed of the injection plunger in a forward direction is fixed thereafter to the speed at the point of time that the value becomes lower than said lower limit in a current molding cycle.

The method according to the present invention has a fifth aspect in that two or more standard values are set up and said moving speed reduction profile is set up in accordance with a different moving speed reduction function for each standard value.

The method according to the present invention has a sixth aspect that a period, during which a comparison between said standard value and said value detected by said first detecting means is effective, is set up for each standard value in accordance with the position of said plunger.

The method according to the present invention has a seventh aspect in that a period, during which a comparison between said standard value and said value detected by said first detecting means is effective, is set up for each standard value in accordance with the time elapsed from the time that the injection begins.

The method according to the present invention has an eighth aspect in that when said alarm signal is outputted, said standard value in the next molding cycle is corrected.

The method according to the present invention has a ninth aspect in that when said alarm signal is outputted, said function for setting said moving speed reduction profile is changed to correct the moving speed reduction profile, and the moving speed of said injection plunger is controlled to be reduced in accordance with the thus corrected moving speed reduction profile in the next molding cycle.

The method according to the present invention has a tenth aspect in that when said alarm signal is outputted, the period during which the comparison between said standard value and said value detected by said first detecting means is effective, is changed in the next molding cycle.

Moreover, in order to solve the above-mentioned drawback, an apparatus for controlling the injection speed of injecting molding machines comprises:

a first detection means for detecting a driving force for forwardly moving an injection plunger, which is movably inserted into an injection cylinder for containing melted resin;

a moving speed controlling means for controlling the forwardly moving speed of the plunger to reduce it in accordance with a moving speed decreasing profile set up by using a predetermined speed decreasing function at a point of time that a value detected by said first detecting means exceeds a predetermined standard value.

a second moving speed detecting means for detecting the moving speed of said plunger in a forward direction;

a plunger moving speed judging means for judging at least one of the two cases if said moving speed of the injection plunger detected by said second detecting means exceeds said predetermined upper limit and if said moving speed of said injection plunger detected by said second detecting means is lower than said predetermined lower limit during the moving speed reduction controlling period or at a position where the injection phase is changed to the dwelling phase, and for outputting an alarm signal when said moving speed of the injection plunger exceeds over said upper limit and/or when said moving speed of the injection plunger is lower than said lower limit (the eleventh aspect).

The apparatus according to the present invention further comprises a controlling condition correcting means for conducting at least one of a correction of said standard value in a next molding cycle, a correction of said moving speed control profile in the next molding cycle, and a change of the period, during which the comparison between said standard value and said detection value detected by said first detecting means is effective in the next molding cycle, when said plunger moving speed judging means outputs said alarm signal (the twelfth aspect).

According to the first and eleventh aspects of the present invention, the driving force for moving the injection plunger in a forward direction is detected by said first detecting means, and when the thus detected value exceeds a predetermined standard value the moving speed reduction control of the injection plunger starts in accordance with a predetermined speed decreasing controlling profile directed by a predetermined moving speed reducing function.

During the moving speed reduction controlling period, it is judged if the moving speed of the plunger detected by the second detecting means exceeds the predetermined upper limit and/or if the moving speed is lower than the predetermined lower limit, and when the moving speed of the plunger exceeds the upper limit and/or when the moving speed of the plunger is lower than the lower limit, the alarm signal is outputted.

According to the second aspect of the present invention, the judgment whether the moving speed of the plunger is suitable or not is conducted at a position where the injection phase is changed from a filling up phase to a dwelling phase. That is to say, it is judged whether the ending speed of the injection plunger at the dwelling phase switching position is suitable or not.

According to the third aspect of the present invention, at least one of the upper limit and/or the lower limit is/are set up continuously or at a plurality of points with a predetermined pitch and the judgment if the forwardly moving speed of the plunger exceeds the upper limit and/or if the forwardly moving speed of the plunger is/are lower than the lower limit is/are conducted continuously or at a plurality of points during the speed reduction controlling period.

According to the fourth aspect of the present invention, during the moving speed reduction control period, when the forward moving speed of the plunger exceeds said upper limit or becomes slower than the lower limit, the moving speed of the plunger is thereafter fixed to the speed at the time that the moving speed exceeds or becomes slower in the same molding cycle, so that it is prevented that the moving speed of the plunger becomes unsuitable.

According to the fifth aspect of the present invention, two or more standard values, at which the moving speed reduction control starts, are set up and the moving speed reduction controlling profile is set up by a different moving speed reduction function for each standard value.

According to the sixth aspect of the present invention, the period during which the comparison between the standard values, from which the moving speed reduction control starts, and the value detected by said first detecting means is effective, is set up for every standard value in accordance with the position of said injection plunger.

According to the seventh aspect of the present invention, the standard values from which the moving speed reduction control starts are compared with the value detected by said first detecting means and the period during which the comparison is maintained effective is set separately for each standard value based on time elapsed from the start of the injection phase.

According to the eighth aspect of the present invention, when the alarm signal is outputted, said standard values for the next molding cycle are corrected.

According to the ninth aspect of the present invention, when the alarm signal is outputted, said moving speed reduction control profile for the next molding cycle is corrected.

According to the tenth aspect of the present invention, when the alarm signal is outputted, the period, during which the comparison between the standard values, at which the moving speed reduction control starts, and the value detected by said first detecting means is effective, is changed in the next molding cycle.

According to the twelfth aspect of the present invention, when the apparatus responds to output of an alarm signal by conducting at least one operation among correcting said standard values for the next molding cycle, correcting said moving speed reduction control profile for the next molding cycle and changing the period during which the comparison between the standard values and the value detected by said first detecting means is maintained effective (hereinafter referred to as the "effective comparison period").

DETAILED EXPLANATION OF THE PREFERRED EMBODIMENT

Figure 2:
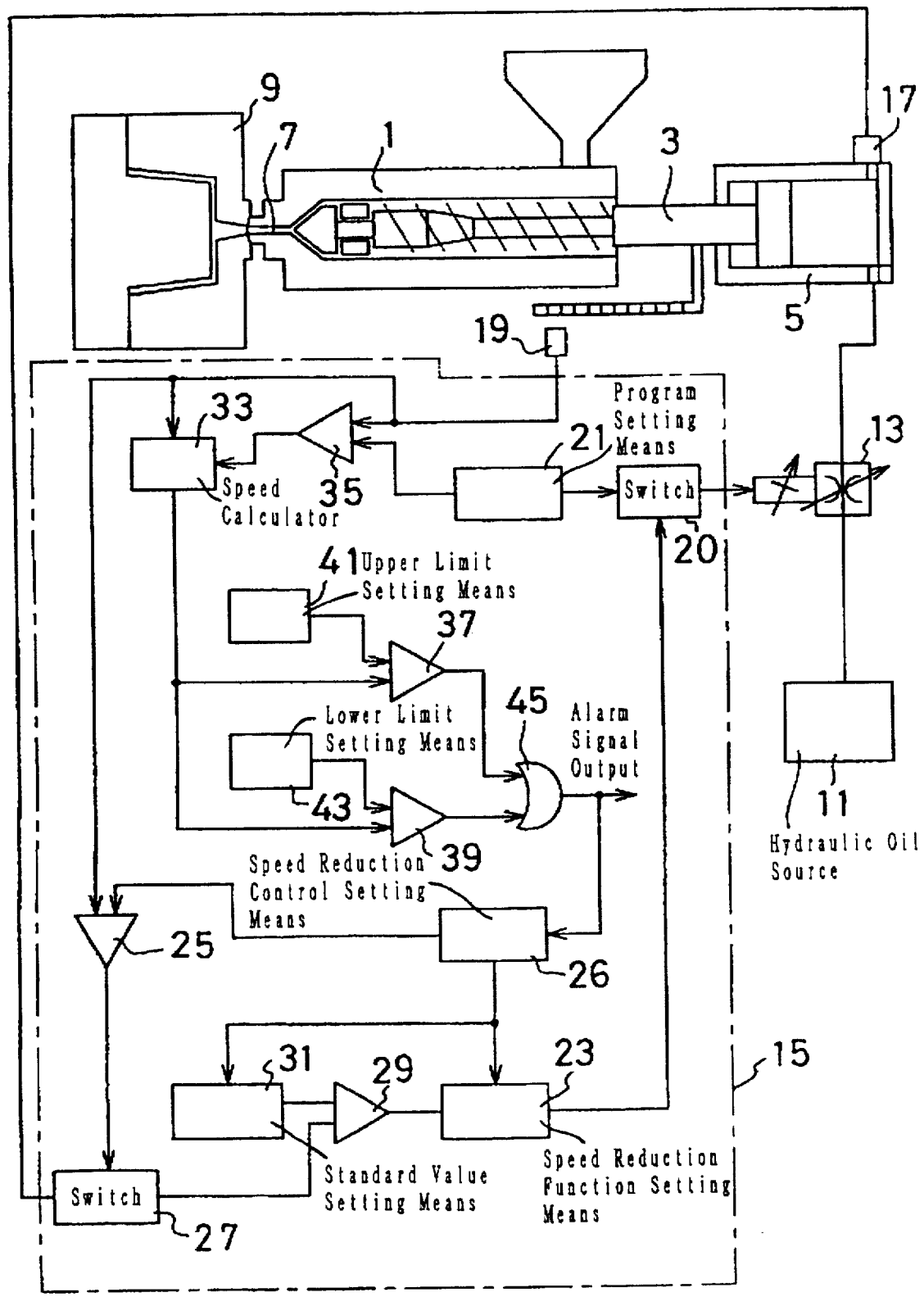
FIG. 2 is a block diagram showing a construction of a first embodiment according to the present invention in which the injection speed controlling apparatus of the present invention is applied to a hydraulic injection molding machine.

FIG. 2 shows a construction of an embodiment where an injection speed controlling apparatus according to the present invention is applied to a hydraulic injection molding machine.

The hydraulic injection molding machine comprises an injection cylinder 1 for containing melted resin; the necessary amount for molding has been preliminarily measured and supplied into the cylinder, an injection plunger 3 having a screw which is movably inserted into said injection cylinder 1, a hydraulic cylinder device 5 for driving said injection plunger 3 in back and forth direction; the melt resin is injected into a mold die 9 via a nozzle 7 by moving the injection plunger 3 in a forward direction.

A hydraulic oil is supplied from a hydraulic oil source 11 into an hydraulic cylinder device 5 via an oil discharge controlling valve 13, by which the discharge amount of oil is measured.

In this case, the moving speed of the injection plunger 3 in a forward direction is determined by the discharge amount of the hydraulic oil supplied into said hydraulic cylinder device 5; the moving speed of the injection plunger 3 in a forward direction is controlled by the control of the discharge amount of hydraulic oil with the aid of the oil discharge amount controlling valve 13.

The oil discharge amount controlling valve 13 is arranged as a variable throttle type electromagnetic control valve by which the discharge amount of hydraulic oil is quantitatively controlled. This valve 13 works in accordance with a speed command signal supplied from the injection speed setting device 15.

To the injection speed setting device 15, are connected a forwardly driving force detector 17 for detecting the forwardly driving force of the injection plunger 3 with the aid of oil pressure in the hydraulic cylinder device 5, and a position detector 19 for detecting the position of the injection plunger 3.

Figure 3:
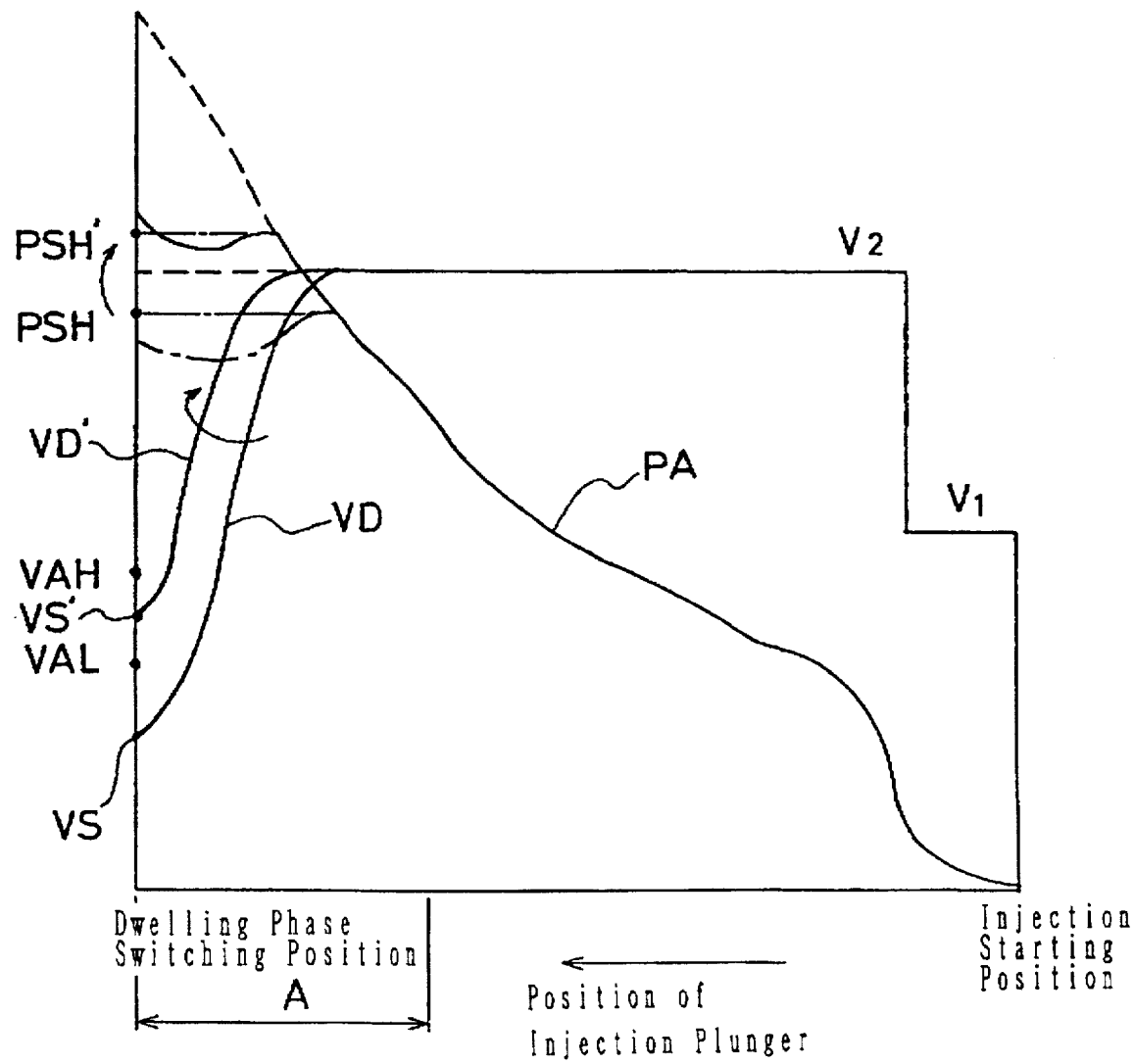
FIG. 3 is a graph depicting an example of a characteristic in a variation of the forwardly moving speed and the forwardly driving force of the injection plunger according to the injection speed controlling method of the injection molding machine of the present invention.

The injection speed setting device 15 comprises a program setting device 21 and the moving speed reduction function setting device 23. In the program setting device 21, a rectangular-shaped program profile is set up, which is shown by values V1 and V2 in FIG. 3, respectively, for controlling the moving speed of the injection plunger 3; in the moving speed reduction function setting device 23, the speed reduction program profile directed from a predetermined moving speed reduction function is set up, which is shown in FIG. 3 by the reference VD. The speed command signal is outputted from either one of the program setting device 21 and the moving speed reduction function setting device 23 to the discharge controlling valve 13. It is arranged that signal supply is switched by a signal switch 20.

A comparator 25 is used to judge whether the present position of the plunger is within a comparison effective period of the forwardly driving force of the plunger. In the comparator 25, the position of the injection plunger 3, which is detected by the positional detector 19, is compared to a predetermined comparison effective period which is preliminarily set in the moving speed reduction control setting device 26; and when the position of the plunger comes in the effective comparison period, the comparator 25 causes the a circuit switch 27 to change ON.

Only when the circuit switch 27 is ON, the detection signal of the forwardly driving force of the injection plunger 3, which is detected by the forwardly driving force detector 17, is supplied to a comparator 29.

The comparator 29 judges whether the forwardly driving force of the injection plunger 3 detected by said forwardly driving force detector 17 arrives to a standard value which is set up by a standard value setting device 31; and when the forwardly driving force for driving the plunger arrives to the standard value, a movement starting command signal is supplied into the moving speed reduction function setting device 23.

When the movement start command signal is supplied, the moving speed reduction function setting device 23 outputs a speed command signal obtained in accordance with the moving speed reduction profile, which is set up in accordance with a command supplied from the moving speed reduction controlling setting device 26, to the discharge amount controlling valve 13 via a signal switch 20.

On the other hand, the speed command signal obtained by the profile, defining the speed V1 and V2 shown in FIG. 3, is outputted from the program setting device 21 to the discharge amount controlling valve 13 until the movement starting command signal is outputted from the comparator 29 to the speed decreasing function setting device 23, in other words, until the forwardly driving force of the injection plunger 3 arrives to the standard value set up by said standard value setting device 31.

A speed calculator 33 calculates the forwardly moving speed of the injection plunger 3 in accordance with the detection value outputted from the positional detector 19.

In a comparator 35, the value detected by the positional detector 19 is compared to a dwelling phase switching position, which is set up in the program setting device 21, so that a "latch" signal is supplied into the speed calculator 33 in order to latch the forwardly moving speed of the injection plunger 3 at the dwelling phase switching position of the plunger.

The signal of the forwardly moving speed of the plunger at the dwelling phase switching position, which is latched by the speed calculator 33, is inputted into an upper limit comparator 37 and a lower limit comparator 39.

The upper limit comparator 37 judges whether the forwardly moving speed of the plunger at the dwelling phase switching position exceeds an upper limit set up in the upper limit setting device 41; when the forwardly moving speed of the plunger exceeds the upper limit, ON signal is outputted from the comparator 37 to an OR circuit 45.

On the other hand, the lower limit comparator 39 judges whether the forwardly moving speed of the plunger at the dwelling phase switching position becomes lower than the lower limit set up in the lower limit setting device 43; when the forwardly moving speed of the plunger is slower than the lower limit, ON signal is outputted from the comparator 39 to the OR circuit 45.

The OR circuit 45 outputs an alarm signal when the ON signal is supplied from either the upper limit comparator 37 or the lower limit comparator 39.

The alarm signal is also supplied into the moving speed reduction control setting device 26, at least one operation is conducted for the next molding cycle, among correcting the standard values set in the standard value setting device 31, the correcting the moving speed reduction function set in the moving speed reduction function setting device 23, and changing of the data of the effective comparison period of the forwardly driving force, which is to be given to the comparator 25. These corrections and the change function as a controlling condition correcting and changing means.

The functions of the injection speed controlling device having the above-mentioned construction will be explained below, referring to the graph in FIG. 3.

When the filling-up phase starts, the moving speed command single is supplied to the discharge amount controlling valve 13 via the signal switch 20 in accordance with the forwardly moving speeds of the plunger V1 and V2, which are set up in the moving speed controlling program profile in the program setting device 21. Thereby, the discharge amount of the hydraulic oil supplied from the hydraulic oil source 11 into the hydraulic cylinder 5 is controlled by the discharge controlling valve 13, so that the injection plunger 3 is forwardly moved depending on its position, and the moving speed thereof varies in accordance with the profile, i.e. from speed V1 to V2.

By the movement of the injection plunger 3 in a forward direction, the forwardly driving force of the injection plunger 3, which is detected by said forwardly driving force detector 17, is increased as shown by the reference symbol PA in FIG. 3.

When the plunger 3 is moved to the comparison effective period A of the forwardly driving force of the plunger, which is preliminarily set up in the moving speed reduction control setting device 24, the circuit switch 27 becomes ON in response to the output signal of the comparator 25; the detecting signal of the forwardly driving force of the plunger 3 detected by the forwardly driving force detector 17 is then sent to the comparator 29.

When the forwardly driving force of the injection plunger 3 detected by the forwardly driving force detector 17 arrives to the standard value PSH, which is set up in the standard value setting device 31, the comparator 29 outputs a movement starting command signal for starting the reduction of the moving speed of the plunger to the moving speed reduction function setting device 23, so that the moving speed reduction function setting device 23 outputs a speed command signal, which is obtained by the moving speed reducing profile as shown by the reference symbol VD in FIG. 3, to the discharge amount controlling valve 13 via the signal switch 20. Thereby, the control for reducing the moving speed of the plunger is conducted in accordance with the moving speed reduction profile VD.

When the injection plunger 3 moves forwardly to the dwelling phase switching position, a signal representing the forwardly moving speed VS of the injection plunger 3 at the dwelling phase switching position, which is calculated by the speed calculator 33, is sent to the upper limit comparator 37 and the lower limit comparator 39, respectively.

In the upper limit comparator 37, it is judged whether the forwardly moving speed VS of the plunger exceeds the upper limit VAH set in the upper limit setting device 41, while in the lower limit comparator 39, it is judged whether the forwardly moving speed VS is slower than the lower limit VAL set in the lower limit setting device 43.

In the case that when the plunger 3 arrives to the dwelling phase switching position and the forwardly moving speed VS of the plunger 3 is within a tolerance range of VAL-VAH, the control is continued as it is.

On the other hand, in the case that the forwardly moving speed VS exceeds the upper limit VAH set in the upper limit setting device 41 or is slower than the lower value VAL set in the lower limit setting device 43, the alarm signal is outputted from the OR circuit 45.

It is automatically and correctly known whether the moving speed reduction control of the injection plunger 3 is conducted in a suitable manner or not, by the existence of the output of the alarm signal.

Upon outputting the alarm signal, at least one of the correction of the standard value PSH in the standard value setting device 31, the correction of the moving speed reduction function set in the moving speed reduction function setting device 23 and the change of the forwardly driving force comparison effective period A, which is given to the comparator 25, is conducted in the moving speed reduction control setting device 26.

In the graph shown in FIG. 3, when the forwardly driving force PA of the injection plunger 3 arrives to the standard value PSH, the moving speed is controlled so as to be reduced in accordance with the moving speed reduction profile VD, which is determined by the predetermined speed reduction function, so that the forwardly moving speed of the injection plunger 3 becomes VS at the dwelling phase switching position.

Since the value VS is lower than the lower limit VAL, a new standard value PSH', which is greater than the old standard value PSH, is correctly set up by using the speed reduction control setting device 26.

In the next molding cycle, the moving speed of the plunger 3 is controlled so as to be reduced in accordance with the new moving speed reduction profile VD' which is obtained by shifting the old one in a forward direction, and then the forwardly moving speed of the injection plunger becomes VS' at the dwelling phase switching position, so that the moving speed becomes within the suitable range, VAL to VAH. Thereafter, the moving speed of the plunger is controlled under the condition that the standard value PSH' is a point when the speed reduction control starts.

Figure 1:
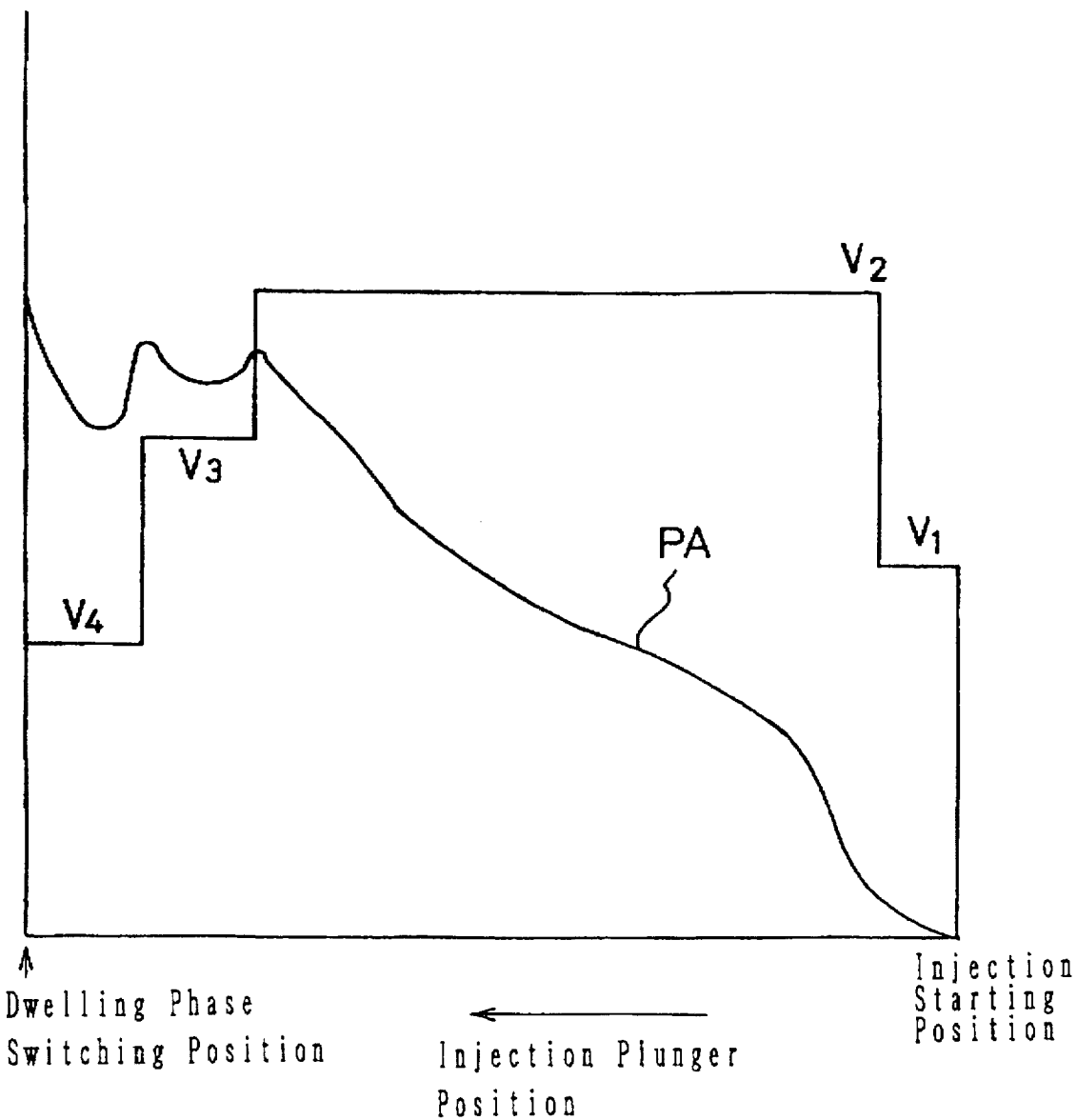
FIG. 1 is a graph illustrating an example of the characteristic variation of a conventional program profile in the control of the injection speed and the variation generated in the driving force for moving the injection plunger in a forward direction.

Comparing the condition of automatically setting-up the moving speed program according to the injection speed controlling method and apparatus of the present invention to that of the conventional method and apparatus shown in FIG. 1, the set up speeds V1 and V2 when the filling phase starts are common, but the conventional speeds V3 and V4 in the third and fourth phase are not defined in the profile according to the present invention.

In the method and apparatus for controlling the injection speed according to the present invention, instead of setting the moving speeds V3 and V4, the standard value PSH for the starting control of the moving speed to be reduced and the upper limit VAH and the lower limit VAL of the injection plunger at the dwelling phase switching position are set up in the automatic setting of the moving speed control program.

Figure 4:
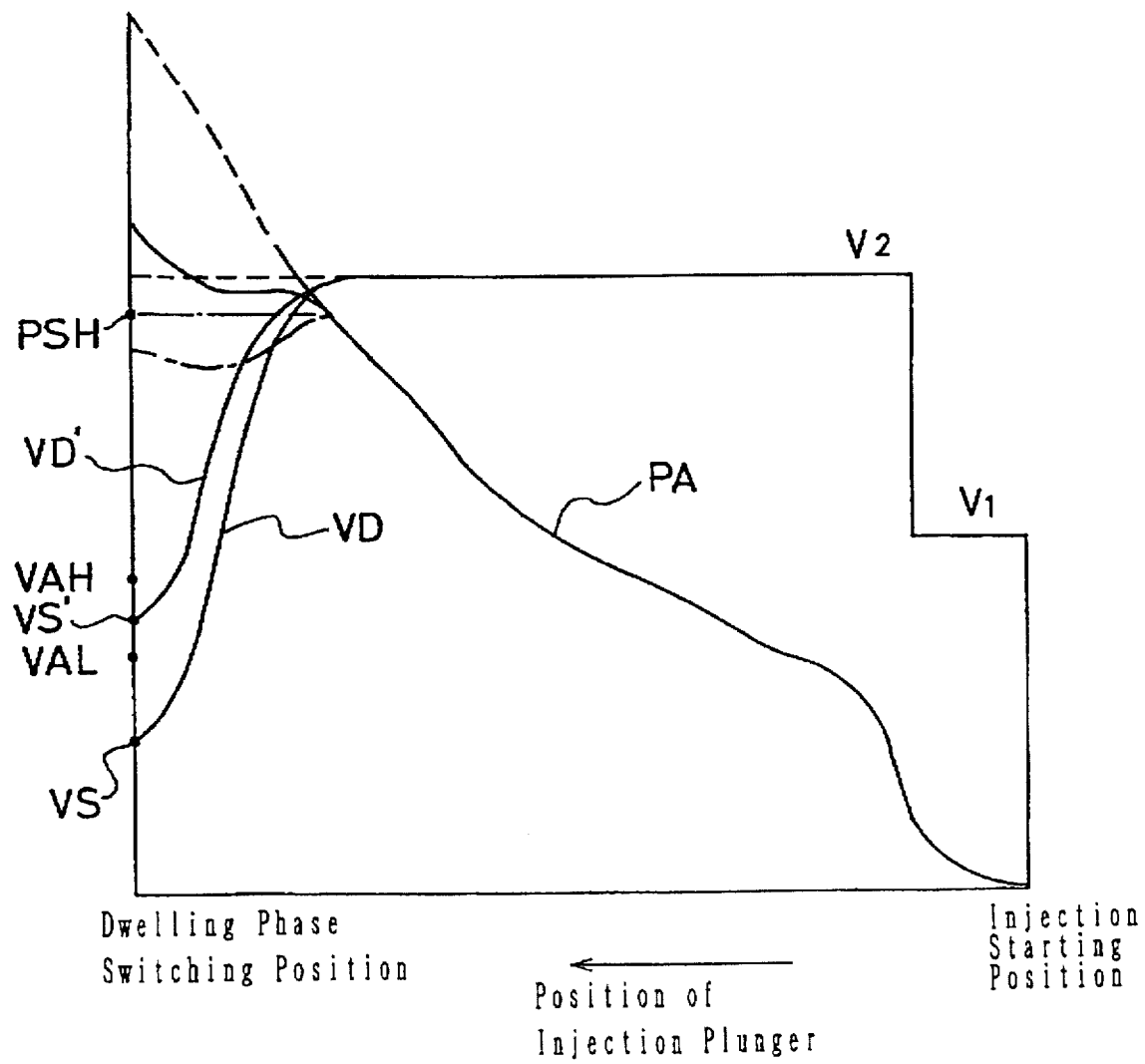
FIG. 4 is a graph illustrating another example of a characteristic in a variation of the forwardly moving speed and the forwardly driving force of the injection plunger according to the injection speed controlling method of the injection molding machine of the present invention.

When the alarm is outputted, it may be possible to correct the moving speed reduction function, which is set in the moving speed reduction function setting device 23 as shown in FIG. 4, instead of the correction of the standard value PSH. Thereby, the moving speed reduction profile may be changed from VD to VD' in the next molding cycle, so that the forwardly moving speed VS' of the injection plunger 3 at the dwelling phase switching position becomes within the suitable range VAL to VHL in the next molding cycle.

Figure 5:
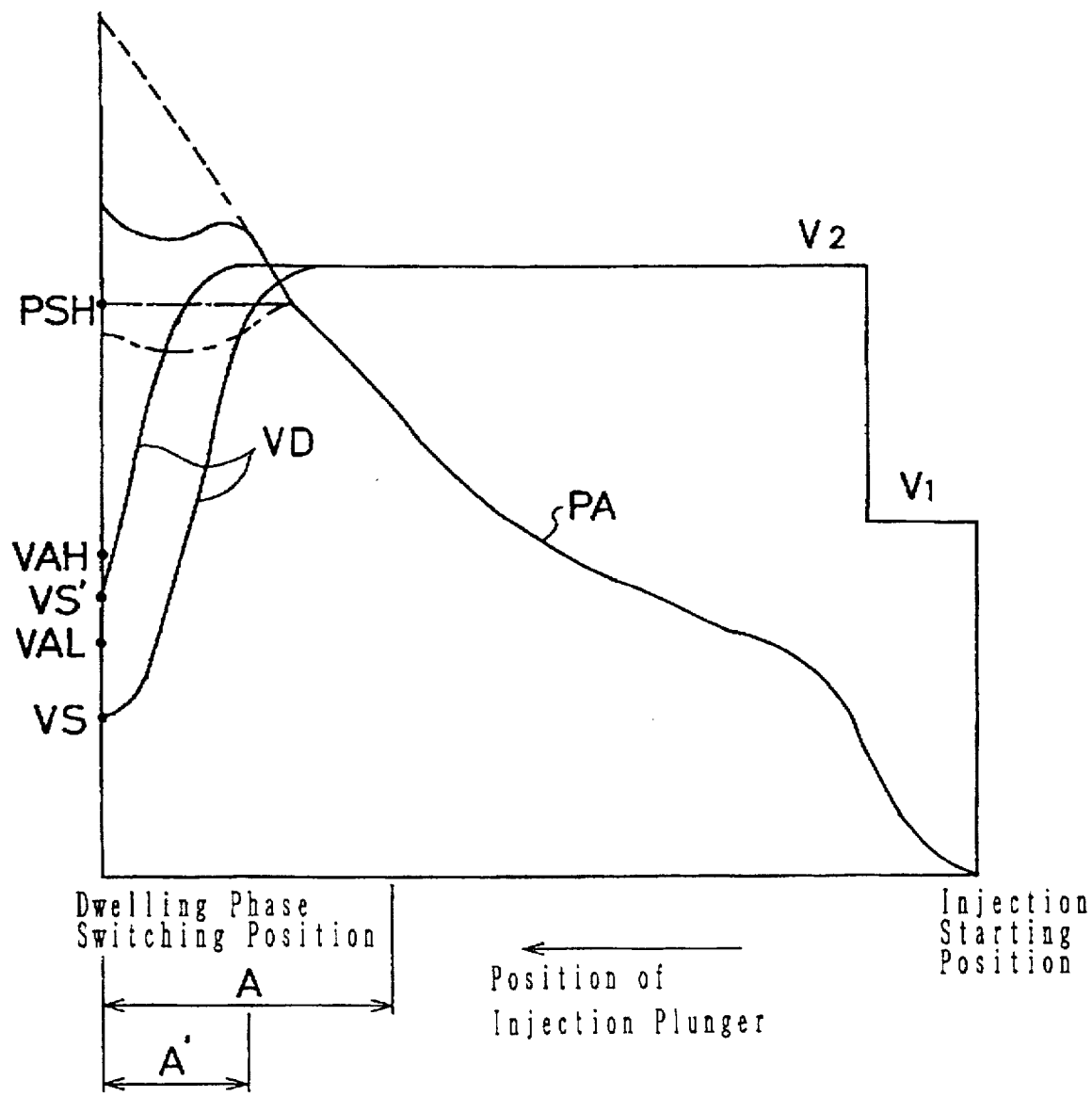
FIG. 5 is a graph showing still another example of a characteristic in a variation of the forwardly moving speed and the forwardly driving force of the injection plunger according to the injection speed controlling method of the injection molding machine of the present invention.

When the alarm is outputted, it may be further possible to change the comparison effective period of the forwardly driving force from A to A', which is given to the comparator 25, as shown in FIG. 5. Thereby, the starting point to reduce the moving speed of the plunger,which is determined by the speed reduction profile VD, is changed, so that the forwardly moving speed VS' of the injection plunger at the dwelling phase switching position comes within the suitable range of VAL to HL in the next molding cycle.

By the correction or the change of the moving speed reduction control conditions, the moving speed reduction control characteristic of the plunger automatically becomes optimum.

Furthermore, it may be possible to set two or more standard values in a selectable manner, so that the moving speed reduction controlling profile are set up by the two or more different moving speed reduction function for each standard value. By such an arrangement, the moving speed reduction control can be conducted with a much more suitable characteristic, which complies with the requirements of injection molding in detail.

Figure 6:
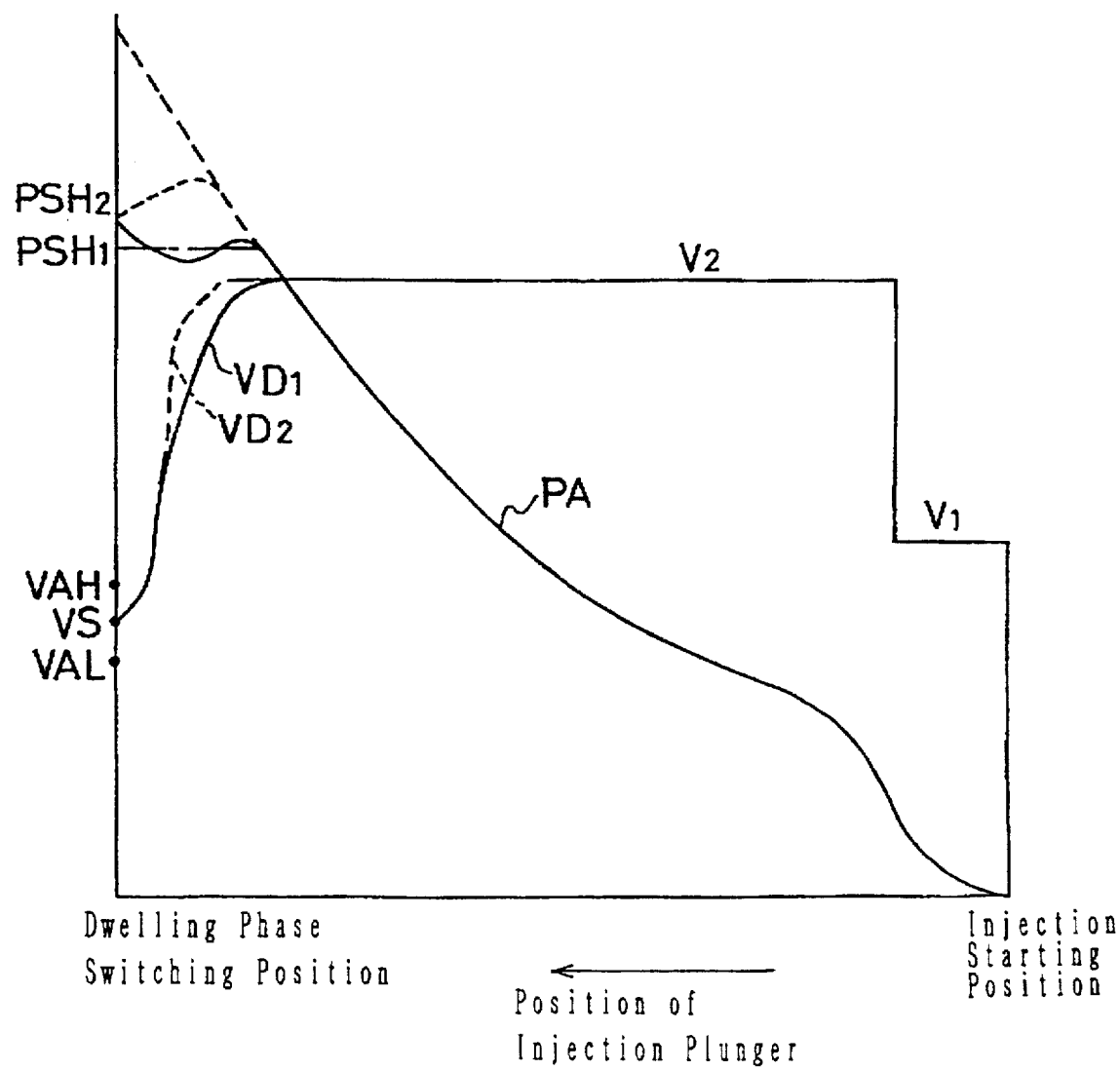
FIG. 6 is a graph depicting still another example of a characteristic in a variation of the forwardly moving speed and the forwardly driving force of the injection plunger according to the injection speed controlling method of the injection molding machine of the present invention.

In a graph shown in FIG. 6, such a profile is illustrated where a moving speed reduction profile VD1 is set up for a standard value PSH1 according to a predetermined moving speed reduction function, a moving speed reduction profile VD2, is set up for the standard value PSH2 according to the other moving speed reduction function, which is different from the function for determining the profile VD1.

Figure 7:
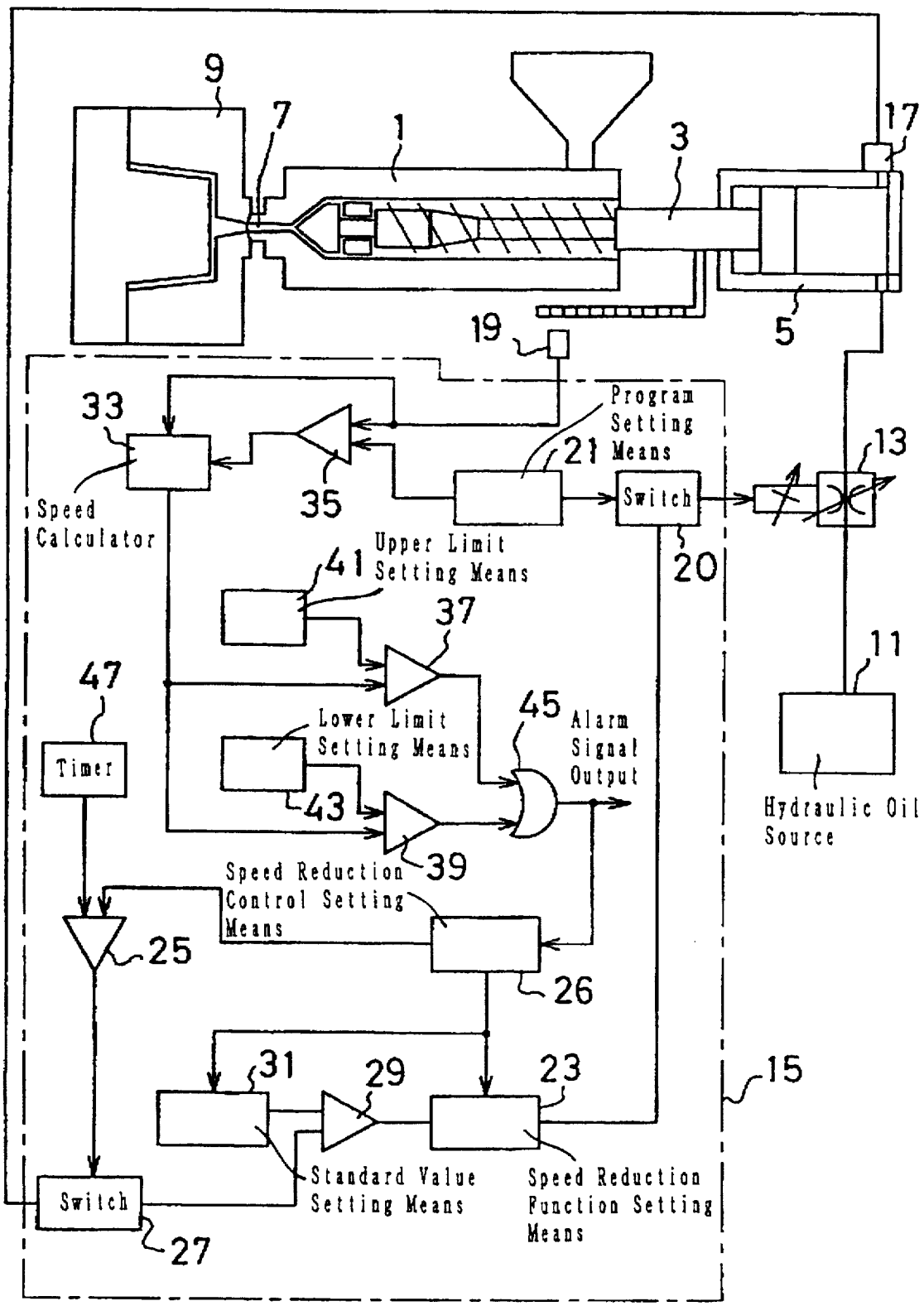
FIG. 7 is a block diagram illustrating another embodiment of the injection speed controlling apparatus according to the present invention which is applied to a hydraulic injection molding machine.

FIG. 7 shows a construction of a second embodiment in which the injection speed control apparatus according to the present invention is applied to a hydraulic injection molding machine. It should be noted that the same numerical references are used for the same elements as those shown in FIG. 2, and the explanation therefore is omitted here.

In the second embodiment, the comparison effective period of the forwardly driving force of the plunger is designated in the moving speed reduction control setting device 26 in accordance with the time elapsed from the point when the filling-up of the resin starts. Therefore, in the comparator 25, the clock signal sent from a timer 47 is compared to the comparison effective period designated in the moving speed reduction control setting device 26; when the clock signal becomes to the comparative effective period the circuit switch 27 becomes ON.

The construction of the second embodiment is almost the same as that of the first embodiment, except that the comparative effective period of the forwardly driving force of the plunger is set up in accordance with the time elapsed when the filling-up phase starts. Therefore, the same function as that of the first embodiment can be obtained in the second embodiment.

Figure 8:
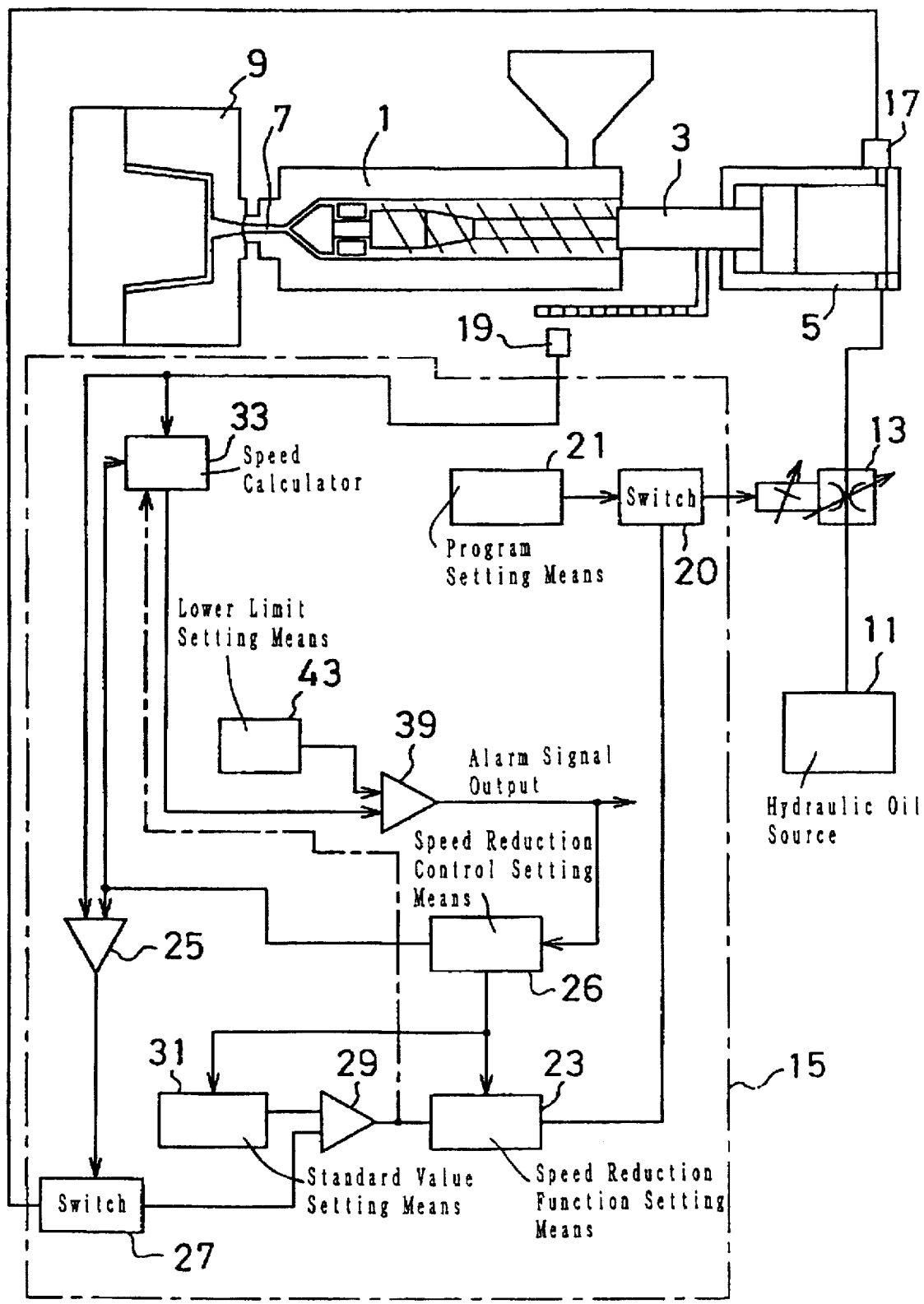
FIG. 8 is a block diagram representing still another embodiment of the injection speed controlling apparatus according to the present invention which is applied to a hydraulic injection molding machine.

FIG. 8 is a schematic view showing a construction of the third embodiment, where the injection speed controlling apparatus according to the invention is applied to a hydraulic injection molding machine. It should be noted, the same numerical numbers are used to the elements as those of the first embodiment, and the explanation therefore is omitted.

In the third embodiment, a signal showing that the plunger is in the comparison effective period is given from the moving speed reduction control setting device 24 to the speed calculator 33 or a signal showing that the plunger is in the moving speed reduction controlling period is given from the comparator 29 to the speed calculator 33. In the speed calculator 33, during the time that the signal shows that the plunger is in the effective comparison period or in the moving speed reduction controlling period, the forwardly moving speed of the injection plunger 3 is calculated by using a detection value outputted from the positional detector 19. The value calculated in the speed calculator 33 is inputted into the lower limit comparator 39.

In the lower limit comparator 39, it is judged whether the forwardly moving speed of the plunger is slower than the lower limit, which is set up in the lower limit setting device 43 during the comparison effective period or the moving speed reduction control period. When the forwardly moving speed of the plunger is lower than the lower limit set up in the lower limit set up device 43, an alarm signal is outputted from the lower limit comparator 39. It should be noted that a term "moving speed reduction control period" is used in claims as a general period to represent both the comparison effective period and the moving speed reduction control period.

The alarm signal is also supplied to the moving speed reduction control setting device 26. When the alarm signal is supplied, the moving speed reduction control setting device 26 sends a command to fix the forwardly moving speed of the injection plunger to the speed at the time that the alarm signal is supplied. Further, in response to the output of the alarm signal, the device 26 conducts at least one operation among correcting the standard value set in the standard value setting device 31 for the next molding cycle, correcting the moving speed reduction function set in the moving speed reduction function setting device 23 for the next molding cycle, and changing the data of the effective comparison period of the forwardly driving force, which is to be given to the comparator 25.

In the third embodiment, it is arranged such that when the forwardly moving speed of the plunger becomes slower than the lower limit set in the lower limit setting device 43, the forwardly moving speed of the plunger is thereafter fixed to the speed at that time. Therefore, the moving speed of the plunger in the same molding cycle does not become slower than the lower limit, so that it can be prevented that the forwardly moving speed of the plunger becomes worse than that.

Figure 9:
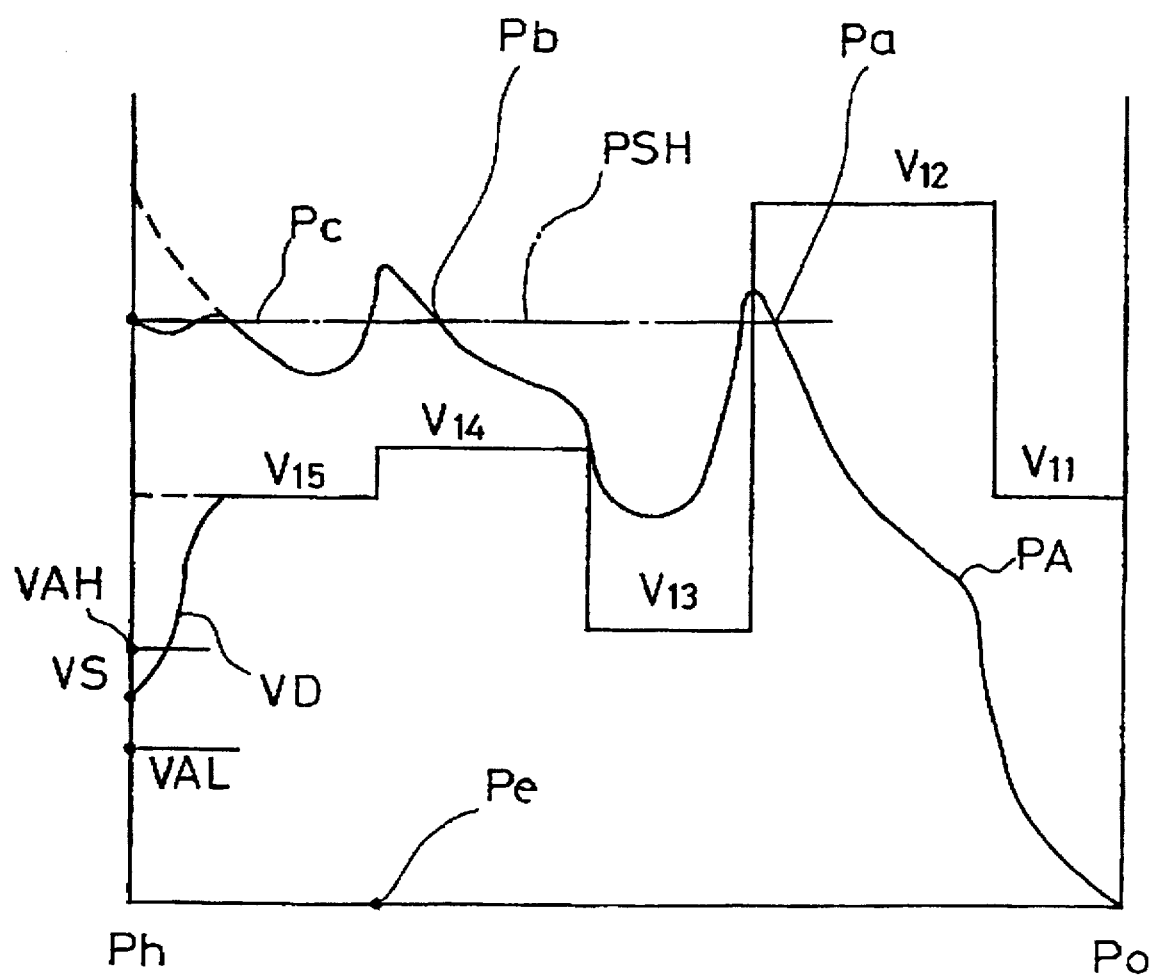
FIG. 9 is a graph showing still another example of a characteristic in a variation of the forwardly moving speed and the forwardly driving force of the injection plunger according to the injection speed controlling method of the injection molding machine of the present invention.

FIG. 9 is a graph representing an example of the injection speed control, where a multi-step profile for controlling the plunger speed is set up. In case the moving speed of the injection plunger is controlled according to the multi-step profile V11, V2, V13, V14, V15, the forwardly driving force PA for driving the injection plunger 3 is increased or decreased repeatedly as shown in FIG. 9.

In this case, by the arrangement that the reduction control of the moving speed f the plunger at the time when the driving force PA arrives to the standard value PSH, the forwardly driving force PA arrives to the standard value PSH at three points of Pa, Pb and Pc.

However, it is actually required to start the reduction of the speed at the point Pc. Therefore, the comparison effective period for comparing the forwardly driving force PA of the injection plunger and the standard value PSH should be limited to the period from the point Pe to Ph; during the period from the point Pa to Pe, the control should be conducted without comparison. Thereby, the moving speed reduction control starts from the point Pc in accordance with the moving speed reduction profile VD.

The judgment whether the moving speed of the plunger VS at the dwelling phase switching position is within the tolerance range VAH to VAL, and the correction or change of the speed reduction condition thereafter may be conducted in the same way as the case shown in FIG. 2.

In any of the above mentioned embodiments, the judgment whether the forwardly moving speed of the plunger is suitable or not is conducted only at the dwelling phase switching position. However, it may be possible to conduct the judgment such that at least one of the upper limit VAH and the lower limit VAL is set up continuously or at a plurality of points with a predetermined pitch, in accordance with the moving speed reduction control characteristic within the speed decreasing control period, so that at least one of the judgments whether the forwardly moving speed VS of the injection plunger 3 exceeds the predetermined upper limit VAH and whether the moving speed VS is slower than the predetermined lower limit is conducted continuously, or at least at two points.

Figure 10:
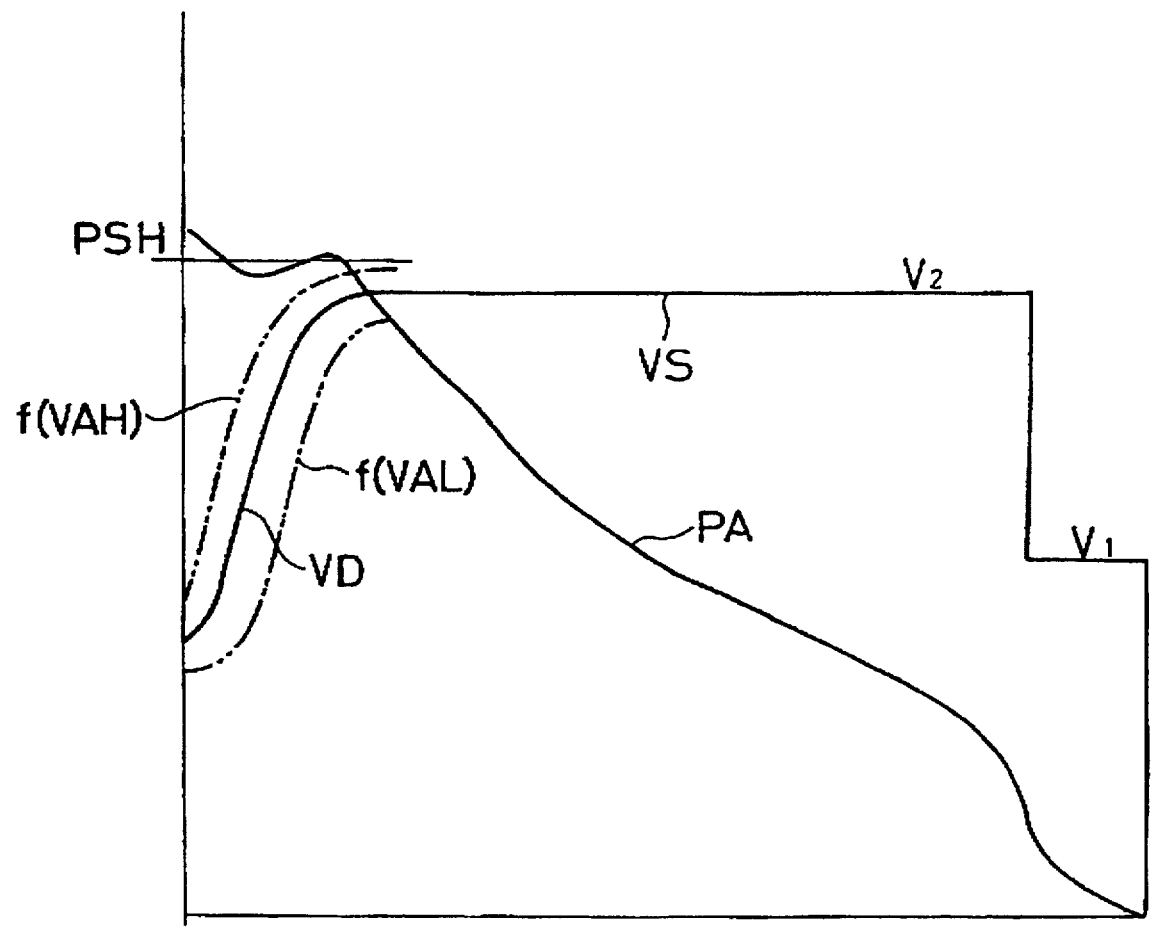
FIG. 10 is a graph illustrating still another example of a characteristic in a variation of the forwardly moving speed and the forwardly driving force of the injection plunger according to the injection speed controlling method of the injection molding machine of the present invention.

In a graph shown in FIG. 10, is shown an example of a characteristic of the variation of the forwardly moving speed and the forwardly driving force of the injection plunger when the above-said judgment is continuously conducted in the moving speed reduction control period. In this case, the upper and lower limits f(VAH) and f(VAL) are preliminarily set in the program setting device 21. These limitations are determined by a function f, which are suitable to the moving speed reduction characteristic.

The judgment whether the forwardly moving speed VS of the injection plunger 3 is within the suitable range of f(VAL) to f(VAH) is thereby conducted continuously according to the position of the plunger, so that the injection speed control can be carried out more correctly.

As explained above, in the method and apparatus for controlling the injection speed of injection molding machines according to the present invention, the driving force for moving the injection plunger forwardly is detected by the first detecting means; when the value detected by the first detecting means exceeds the predetermined standard value, the moving speed reduction control of the injection plunger is started in accordance with the moving speed reduction control profile determined by the predetermined moving speed reduction function within the period; it is judged whether the forwardly moving speed of the plunger, which is detected by the second detecting means, exceeds the predetermined upper limit or not and whether the moving speed is slower than the lower limit or not; in at least one of the cases where the forwardly moving speed of the plunger exceeds the upper limit or the moving speed is slower than the lower limit, an alarm signal is outputted. Therefore, it is automatically and correctly known whether the moving speed reduction control characteristic of the injection plunger is set up in a suitable manner or not.

According to the method of the present invention, the judgment whether the forwardly moving speed of the plunger is controlled in a suitable manner or not is conducted at the dwelling phase switching position. Therefore, the judgment whether the terminal speed of the injection plunger at the dwelling phase switching position is suitable or not is conducted, so that it may be possible to know whether the ending speed of the injection plunger is set up without exceeding or lowering the range.

According to the method of the present invention, at least one of the upper limit and the lower limit is (are) set up continuously or at a plurality of points with a predetermined pitch in the moving speed reduction control period in accordance with the moving speed reduction control characteristic; thus at least one of the judgments whether the forwardly moving speed of the plunger exceeds the predetermined upper limit or not and whether the moving speed is slower than the lower limit or not is (are) conducted continuously or at a plurality of points. Therefore, the forwardly moving speed of the injector plunger in the moving speed reduction control period is monitored in a continuous manner or at a plurality of points, so that the injecting speed control can be conducted more correctly.

According to the method of the present invention, when the forwardly moving speed of the plunger becomes slower than the lower limit within the moving speed reduction control period, the moving speed of the plunger is fixed to the relevant speed at that time in the same molding cycle, therefore,it becomes possible to prevent that the forwardly moving speed of the plunger becomes unsuitable.

According to the method of the present invention, two or more standard values, at which the moving speed reduction control starts, are set up; and the forwardly moving speed of the injection plunger is controlled to be reduced in accordance with the moving speed reduction profile set up by the different speed decreasing function for each of the standard values, respectively. Therefore, the moving speed reduction control is carried out to closely meet with the required characteristic.

According to the method of the present invention, the comparison effective term for comparing the standard value, at which the moving speed reduction control is started, with the value detected by the first detecting means, is set up at every standard value on the basis of the position of the injection plunger or the time lapsed from the injection starting point. Therefore, even if the driving force to move the injection plunger forwardly is increased or decreased during the filling up phase, the moving speed reduction control always starts from the correct point.

According to the present invention, when the alarm signal is outputted, the standard value is corrected for the next molding cycle. Therefore, the standard value for the start of the moving speed reduction control is suitably learned and then changed to a correct value, so that the moving speed reduction control characteristic automatically becomes most suitable without demanding any know how in injection molding.

According to the method of the injection molding machine of the present invention, when the alarm signal is outputted, the moving speed reduction control profile for the next molding cycle is corrected. Therefore, the correct speed decreasing control profile is learned and then the profile is changed to the correct one, so that the moving speed reduction control characteristic automatically becomes most suitable without demanding any know how in injection molding.

According to the present invention, when the alarm signal is outputted, the period for making effective the comparison between the standard value and the detection value detected by said first detecting means (the comparison effective term) is changed in the next molding cycle. Therefore, the comparison effective term is learned and then changed to the correct one, so that the moving speed reduction control characteristic automatically becomes most suitable without demanding any know how in injection molding.

According to the method of the present invention, when the alarm signal is outputted, at least one of the correction of the standard values, the correction of the moving speed reduction control profile, and the change of the term for making the comparison between the standard value and the detection value detected by said detecting means effective, is conducted. Therefore, the moving speed reduction control characteristic automatically becomes most suitable automatically without demanding any know how in injection molding.

What is claimed is:

1. A method for controlling injection speed of an injection molding machine, comprising the steps of:
    detecting a driving force for forwardly moving an injection plunger movably inserted into an injection cylinder using a first detecting device;
    reducing moving speed of the injection plunger in accordance with a moving speed reduction profile determined from a predetermined moving speed reduction function when a value detected by said first detecting device exceeds a predetermined standard value;
    detecting moving speed of the injection plunger using a second detecting device during a period when the moving speed of the plunger is being reduced;
    determining whether the moving speed detected by said second detecting device is above a predetermined upper limit or is below a predetermined lower limit; and
    outputting an alarm signal when the moving speed detected by said second detecting device is above said predetermined upper limit or is below said predetermined lower limit.

2. A method according to claim 1, wherein said step of determining is done at a position where an injection phase is changed from a filling-up phase to a dwelling phase.

3. A method according to claim 1, wherein at least one of the upper limit and the lower limit comprises a continuous line in accordance with the moving speed reduction profile, so that said step of determining is conducted continuously during the moving speed reduction period.

4. A method according to claim 1, wherein at least one of the upper limit and the lower limit comprises a plurality of points in accordance with the moving speed reduction profile, so that said step of determining is conducted at said plurality of points during the moving speed reduction period.

5. A method according to claim 1, wherein when the moving speed detected by the second detecting device is below said lower limit during the moving speed reduction period, the moving speed of the injection plunger in the forward direction is fixed thereafter to a moving speed at a point in time when the speed becomes lower than said lower limit in a current molding cycle.

6. A method according to any one of claims 1 to 5, wherein at least two standard values are established and said moving speed reduction profile is determined in accordance with a different moving speed reduction function for each standard value.

7. A method according to any one of claims 1 to 5 wherein a term, during which a comparison between said standard value and said moving speed detected by said first detecting device is effective, is established for each standard value in accordance with a position of said plunger.

8. A method according to any one of claims 1 to 5 wherein a period, during which a comparison between said standard value and said moving speed detected by said first detecting device is effective, is established at every standard value in accordance with an amount time elapsed from a point of time when injection starts.

9. A method according to any one of claims 1 to 5 wherein when said alarm signal is outputted, said standard value in a subsequent molding cycle is corrected.

10. A method according to any one of claims 1 to 5, wherein when said alarm signal is outputted, said predetermined moving speed reduction function is changed to correct the moving speed reduction profile, and the moving speed of said injection plunger is reduced in accordance with the corrected moving speed reduction profile in a subsequent molding cycle.

11. A method according to claims 7, wherein when said alarm signal is outputted, the period during which the comparison between said standard value and said moving speed detected by said first detecting device is effective, is changed in a subsequent molding cycle.

12. A method according to claims 8, wherein when said alarm signal is outputted, the period during which the comparison between said standard value and said moving speed detected by said first detecting device is effective, is changed in a subsequent molding cycle.

13. An apparatus for controlling injection speed of an injecting molding machine, comprising:

first detection means for detecting a driving force for forwardly moving an injection plunger movably inserted into an injection cylinder for containing melted resin;

moving speed controlling means for reducing forwardly moving speed of the injection plunger in accordance with a moving speed reduction profile determined from a predetermined moving speed reduction function when a value detected by said first detecting means exceeds a predetermined standard value, second moving speed detecting means for detecting moving speed of said plunger; and determining means for determining if said moving speed of the injection plunger detected by said second detecting means is above a predetermined upper limit and if said moving speed of said injection plunger detected by said second detecting means if below a predetermined lower limit while said moving speed controlling means is reducing said moving speed, and for outputting an alarm signal when said moving speed is above said upper limit and when said moving speed is below said lower limit.

14. An apparatus according to claim 13, further comprising a controlling condition correcting means for correcting said standard value for a subsequent molding cycle, for correcting said moving speed control profile for the subsequent molding cycle, and for changing a period during which the comparison between said standard value and moving speed detected by said first detecting means is maintained effective for the subsequent molding cycle when said determining means outputs said alarm signal.

* * * * *